United States Patent
Arai et al.

[11] Patent Number: 5,190,417
[45] Date of Patent: Mar. 2, 1993

[54] THROWAWAY INSERT

[75] Inventors: Tatsuo Arai; Takayoshi Saito, both of Ibaraki, Japan

[73] Assignee: Mitsubishi Materials Corporation, Tokyo, Japan

[21] Appl. No.: 798,644

[22] Filed: Nov. 26, 1991

[30] Foreign Application Priority Data

Nov. 26, 1990 [JP] Japan .................. 2-124002[U]

[51] Int. Cl.$^5$ .............................................. B26D 1/12
[52] U.S. Cl. ........................................ 407/40; 407/42; 407/114
[58] Field of Search ................. 407/34, 40, 42, 48, 407/53, 102, 103, 36, 37, 39

[56] References Cited

U.S. PATENT DOCUMENTS

| | | | |
|---|---|---|---|
| 3,818,562 | 6/1974 | Lacey | 29/105 |
| 3,955,259 | 5/1976 | Gustafsson | 407/40 X |
| 4,529,339 | 7/1985 | Shimomura et al. | 407/42 X |
| 4,597,695 | 7/1986 | Johnson | 407/34 X |
| 4,632,607 | 12/1986 | Pantzar | 407/42 X |
| 5,028,175 | 7/1991 | Pawlik | 407/40 |
| 5,078,550 | 1/1992 | Satran et al. | 407/34 |
| 5,082,400 | 1/1992 | Shiratori et al. | 407/42 |

FOREIGN PATENT DOCUMENTS

| | | |
|---|---|---|
| 0104517 | 4/1984 | European Pat. Off. |
| 0334129 | 9/1989 | European Pat. Off. |
| 2336598 | 1/1974 | Fed. Rep. of Germany |

Primary Examiner—Larry I. Schwartz
Assistant Examiner—J. R. Daulton
Attorney, Agent, or Firm—Cushman, Darby & Cushman

[57] ABSTRACT

A throwaway insert having a generally quadrilateral-shaped flat plate configuration is disclosed that includes first and second major faces disposed parallel and opposite to each other; oppositely facing first and second side faces extending between the first major face and the second major face; remaining oppositely facing third and fourth side faces extending between the first major face and the second major face; major cutting edges, one each constituted along each of the intersections of the first and second major faces with the first and second side faces minor flanks, one each constituted along the intersections of each of the first and second major faces with the third and fourth side faces, the minor flanks extending between a pair of oppositely formed intersections of the first major face with the first and second side faces, and between a pair of the oppositely formed intersections of the second major face with the first and second side faces, where the intersection constitutes the major cutting edge; and minor cutting edges respectively constituted along the intersection of one end of the minor flanks with either of the first and second side faces. The minor flanks include a transition portion so as to form a multi-stage face of concave cross section including at least two face elements.

5 Claims, 5 Drawing Sheets

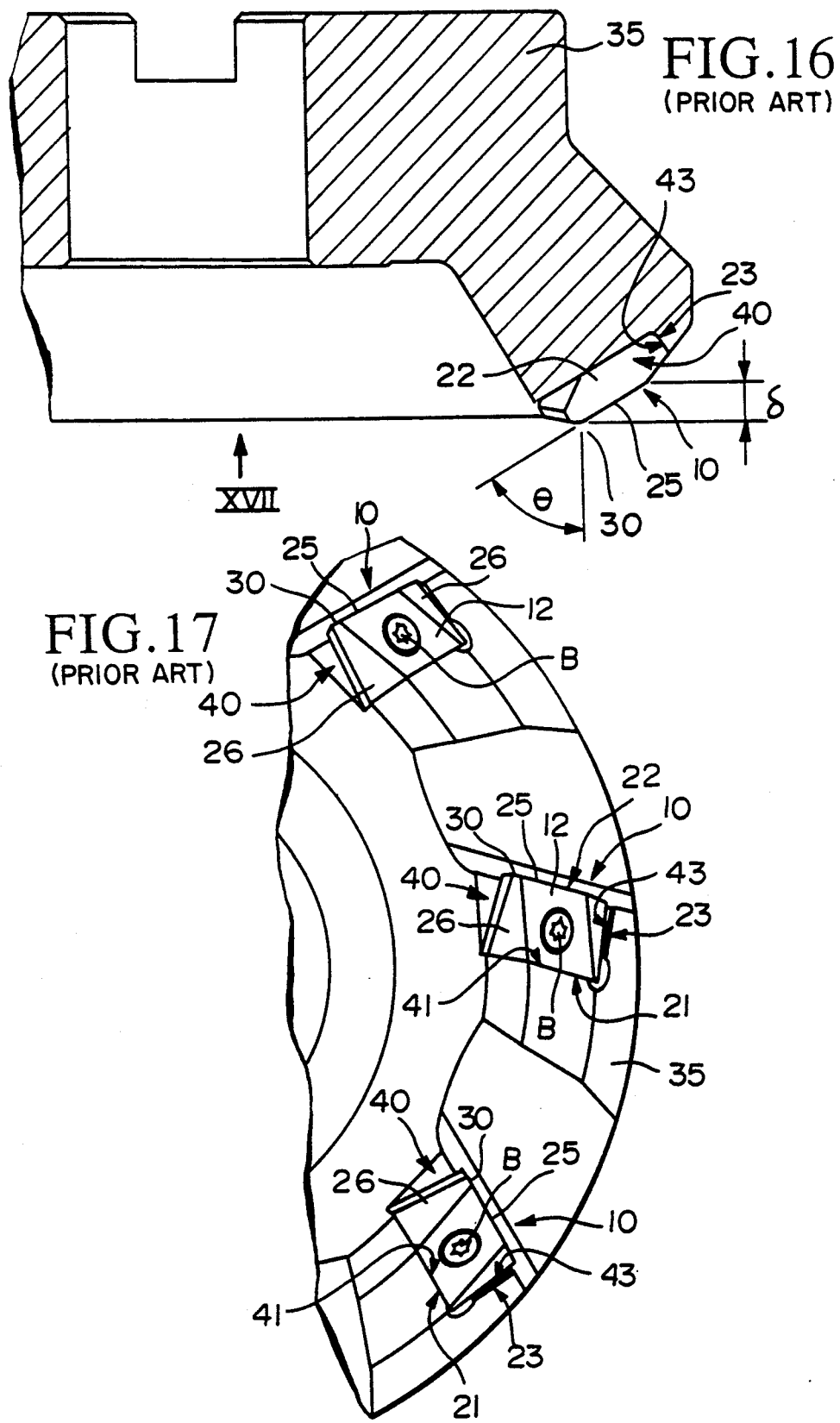

THROWAWAY INSERT

BACKGROUND OF THE INVENTION

The present invention relates to a throwaway tip or insert adapted to be used for cutting tools, such as face cutters, and more particularly to a throwaway insert adapted to be suitably mounted on a tool body of a vertical cutting edge type face cutter so that either one of a first (or upper) and a second (or lower) major faces of the insert, disposed in parallel and opposite to each other, is located so as to constitute a flank which faces toward the external circumference of the tool body.

Recently, in the art of conventional cutting tools such as face cutters, especially for cutting high hardness material and hard-to-machine material such as stainless steel, a so-called vertical cutting edge type cutting tool is widely used, because of high tool rigidity being secured thereby, in that throwaway inserts of a flat shape type are mounted on the tool body so that either one of an upper and a lower major faces of the insert, disposed in parallel and opposite to each other, is located so as to constitute a flank which faces toward the external circumference of the tool body.

Shown in FIGS. 11 to 15 is an insert 10 adapted for such a vertical cutting edge type face cutter is, which has a rectangular flat plate configuration, and comprises a first (or upper) and a second (or lower) major faces 12 and 14 disposed parallel and opposite to each other in the direction of the thickness of the flat plate; a first pair of oppositely facing side faces 21 and 22 extending between the two opposite side margins of the first major face 12 and two opposite side margins of the second major face 14; and a remaining second pair of oppositely facing side faces 23 and 24 extending between remaining two side margins of the first major face 12 and remaining two side margins of the second major face 14. A first pair of major cutting edges 25, 25 and a second pair of major cutting edges 25, 25 are respectively constituted along each of the intersections of the first major face 12 with each of the first pair of side faces 21 and 22, and the intersections of the second major face 14 with the first pair of side faces 21 and 22. Minor flanks 26, 26, 26, 26 are respectively formed along each of the intersections of the second pair of side faces 23, 24 with the first and second major faces 12, 14, extending between the opposite intersections of the major faces and the side faces where the intersection constitutes a major cutting edge. Also, minor cutting edges 30, 30, 30, 30 are respectively constituted along the intersections of one end of the minor flanks 26, 26, 26, 26 with the side faces 21 and 22.

The minor flanks 26, 26, 26, 26 are respectively formed by beveling the intersections of the major faces 12, 14 and second side faces 23, 24 at a predetermined angle, to constitute a slant face which recesses inwardly as the minor flank proceeds from the one end thereof, where the minor cutting edges 30 is formed, toward the other end thereof, whereby each of the minor cutting edges 30 is provided with a predetermined insert relief angle $\phi_c$. Hereby, an insert relief angle $\phi_c$ means a slant angle between the minor flank and an imaginary intersection 32 which would be formed between the major face 14 and the side face 23 if the slant minor flank 26 were not formed. The insert 10 is provided with a bolt hole 11 through which a bolt B shown in FIG. 17 is inserted to secure the insert 10 to a tool body 35 shown in FIG. 17.

As shown in FIGS. 16 and 17, the insert 10 formed as above is mounted, and secured with the bolt B, on a mounting seat 40 disposed on an external circumference at the front end of the tool body 35 having a substantially circular configuration, so that a predetermined corner angle $\theta$ is provided to the insert 10 so mounted, to be used for cutting a workpiece (not shown). When mounted, the insert 10 is selectively located on the mounting seat 40 so that either of the first or second major faces 12, 14 is positioned to constitute an external circumference flank which faces toward the external circumference of the tool body 35. In FIGS. 16, 17 the first major face 12 is selected to be the flank. One of the second pair of the side faces 23, 24 facing toward the rear of the tool body 35 in the axial direction of the tool body 35 (23 in the case of FIGS. 16, 17) and one of the first side faces 21, 22 facing opposite the direction of rotation of the tool body 35 (21 in the case of FIGS. 16, 17) are respectively faced and in contact to insert positioning reference faces 43, 41 of the mounting seat 40, to serve as the positioning reference face on the insert side, and also the supporting surface during the cutting operation.

The conventional insert 10 described above has a disadvantage. With respect to the conventional insert, it is known that the length L of the major cutting edges 25, 25, 25, 25 shown in FIG. 11 is made shorter since the other (or rear) end of the minor flank 26 reaches the intersection of the major face, 12 or 14, and the side face, 21 or 22, on which the major cutting edge is formed, whereby a maximum cutting depth $\delta$ of the insert 10, shown in FIG. 16, reduces. The conventional insert 10 described above also has another disadvantage. With respect to the conventional insert, it is known that the surface area of the second pair of the side faces 23, 24 is greatly decreased since the formation of the minor flank 26 removes substantial portions of the side faces 23, 24, whereby the stability of the insert 10 on the tool body 35 is adversely decreased.

SUMMARY OF THE INVENTION

Therefore, an object of the present invention is to provide an insert that secures a longer and ample length of the major cutting edges to obtain a greater cutting depth, compared with the conventional insert.

Another object of present invention is to provide an insert that has the side faces with a greater area to obtain an improved mounting stability when mounted on the tool body, compared with the conventional insert.

According to a first embodiment of the present invention, a throwaway insert having a generally quadrilateral-shaped flat plate configuration is disclosed that comprises: first and second generally quadrilateral-shaped major faces disposed parallel and opposite to each other; a first pair of oppositely facing first and second side faces respectively extending between two opposite side margins of the first major face and two opposite side margins of the second major face; a remaining second pair of oppositely facing third and fourth side faces respectively extending between remaining two side margins of the first major face and remaining two side margins of the second major face; major cutting edges, one each constituted along each of the respective intersections of each of the first and second major faces with each of the first and second side faces; minor flanks, one each respectively constituted along each of the respective intersections of each of the first and second major faces with each of the third and fourth side faces, the minor flanks respectively extending between a pair of oppositely formed intersections of the first major face with the first and second side faces, and between a pair of the oppositely formed intersections of the second major face with the first and second side faces, where the intersection constitutes the major cutting edge; and minor cutting edges, one each respectively constituted along each of the intersection of one end of the minor flanks with either of the first and second side faces. The disclosed throwaway insert is characterized in that each of the minor flanks is bent inwardly to form a multi-stage face of concave cross section comprising a plurality of face elements which adjacently follow one another and collectively extend from the one end to the other end of the minor flank so that the insert relief angle of the face element adjoining the other end of the minor flank so formed is smaller than the insert relief angle of the face element adjoining the one end of the minor flank so formed. Thus, the inwardly bent multi-stage minor flanks comprising a plurality of face elements are introduced.

Therefore, a shorter cut-off portion, and subsequently, a longer effective length of the major cutting edges are obtained compared with the case of the conventional insert where the face element adjoining the one end of the minor flank is extended to the other end of the minor flank to form one unbent single-stage face. Accordingly, an advantage is obtained in that a greater maximum cutting depth can be provided in accordance with the present invention.

With the introduction of an inwardly bent multi-stage minor flank in accordance with the present invention, a smaller portion is cut off by the minor flank from the third and fourth side faces, and subsequently, an increased area is available compared to, the area of such side faces of the conventional insert. Accordingly, in accordance with the present invention, another advantage is provided in that an increased and improved stability of the insert on the tool body is obtained when mounted thereon.

BRIEF DESCRIPTION OF THE DRAWINGS

FIG. 16 is a cross-sectional view of a face milling cutter with the insert of FIG. 11 mounted on a mounting seat thereof;

FIG. 17 is a partial front view of the cutter and the insert of FIG. 16 as seen in the direction indicated by the arrow XVII in FIG. 16.

DESCRIPTION OF THE PREFERRED EMBODIMENTS OF THE INVENTION

Referring to FIGS. 1 to 9, a throwaway insert in accordance with a first embodiment of the present invention will be described below. The same components in the embodiment as described above in accordance with the conventional insert are designated the same symbols, and will not be explained further.

Figure 7:
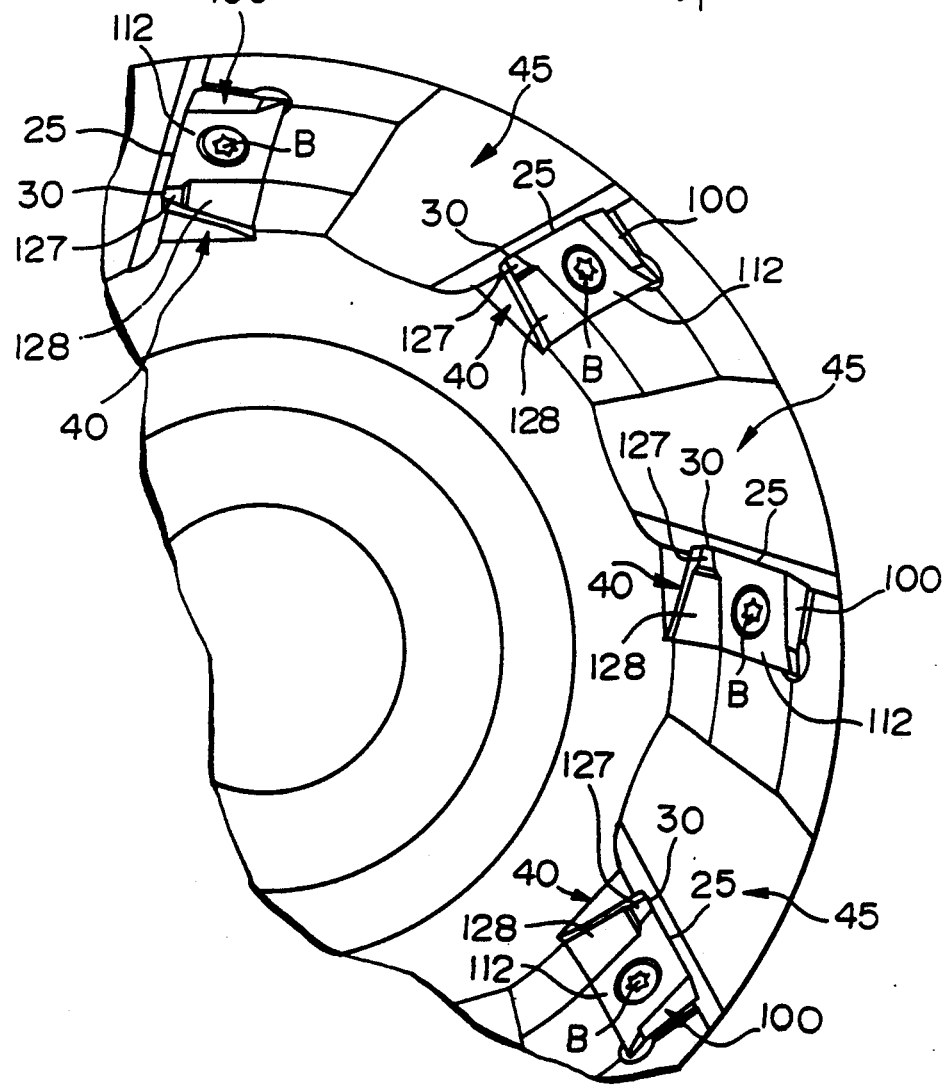
FIG. 7 is a partial front view of the cutter and the insert of FIG. 6 as seen in the direction indicated by the arrow VII in FIG. 6.
Figure 8:
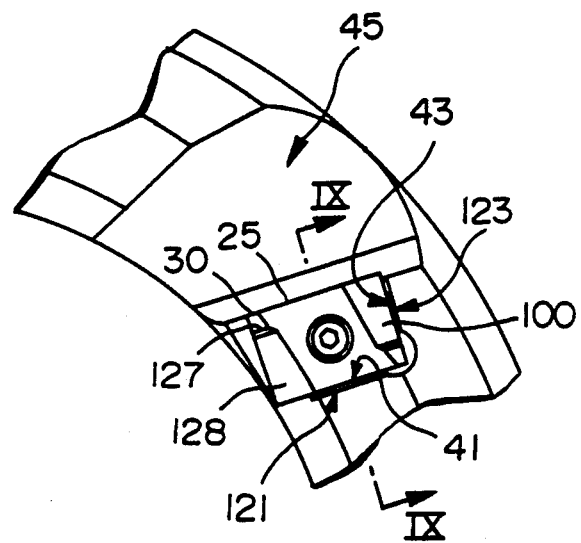
FIG. 8 is a partial side view of the cutter and the insert of FIG. 6 as seen in the direction indicated by the arrow VIII in FIG. 6.
Figure 9:
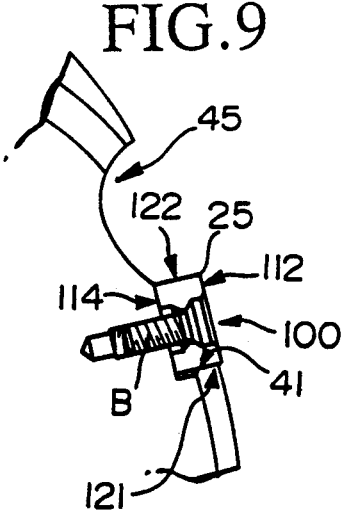
FIG. 9 is a partial cross-sectional view of the cutter and the insert of FIG. 8 taken along the line IX—IX in FIG. 8.
Figure 11:
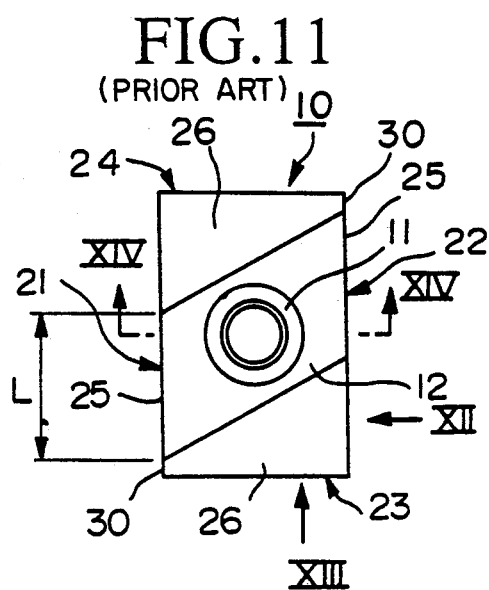
FIG. 11 is a plan view of a conventional throwaway insert.
Figure 12:
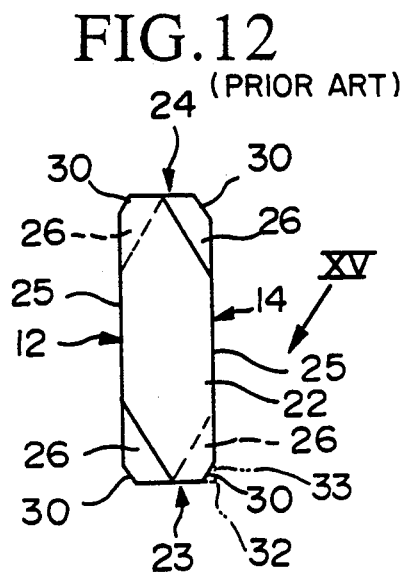
FIG. 12 is a side elevational view of the insert of FIG. 11 seen in the direction indicated by the arrow XII in FIG. 11.
Figure 13:
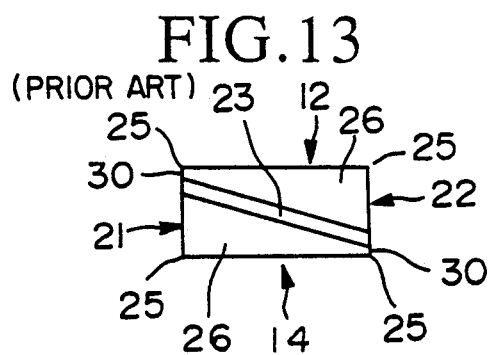
FIG. 13 is a side elevational view of the insert of FIG. 11 seen in the direction indicated by the arrow XIII in FIG. 1.
Figure 14:
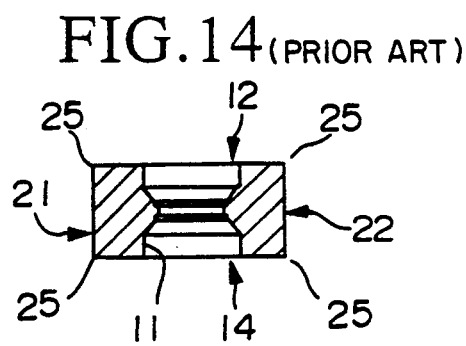
FIG. 14 is a cross-sectional view of the insert of FIG. 11 taken along the line XIV—XIV in FIG. 11.

As shown in FIGS. 1 to 4, the insert 100 of the first embodiment has a rectangular flat plate configuration, similar to that of the conventional insert 10 described above, and comprises a first (or upper) and a second (or lower) major faces 112 and 114 disposed parallel and opposite to each other in the direction of the thickness of the flat plate. A first pair of oppositely facing side faces 121 and 122 extending between the two opposite side margins of the first major face 112 and two opposite side margins of the second major face 114; and a remaining second pair of oppositely facing side faces 123 and 124 extending between remaining two side margins of the first major face 112 and remaining two side margins of the second major face 114. A first pair of major cutting edges 25, 25 and a second pair of major cutting edges 25, 25 are respectively constituted along each of the intersections of the first major face 112 with each of the first pair of side faces 121 and 122, and the intersections of the second major face 114 with the first pair of side faces 121 and 122. Minor flanks 126, 126, 126, 126 are respectively formed along each of the intersections of the second pair of side faces 123, 124 with the first and second major faces 112, 114, extending between the opposite intersections of the major faces and the side faces where the intersection constitutes a major cutting edge 25. Also, minor cutting edges 30, 30, 30, 30 are respectively constituted along the intersections of one end of the minor flanks 26, 26, 26, 26 with the side faces 121 and 122. The insert 100 is provided with a bolt hole 101 through which a bolt B shown in FIGS. 7 to 9 is inserted to secured the insert 10 to a tool body 35 shown in FIG. 6.

Each of the minor flanks 126 is formed to bend once inwardly to form a multi-stage face of concave cross section comprising a pair of first and second face elements 127, 128 which adjacently follow one another and collectively extend from one (or front) end of the minor flank which adjoins the minor cutting edge 30 to the other (or rear) end of the minor flank. The face elements 127, 128 are respectively defined to form a slant face which recesses inwardly at a predetermined angle as the face element proceeds in the direction from the one end toward the other end of the minor flank. The face elements 127, 128 are further interfaced with each other through a connecting element which has a small-radius concave cross section along the direction from the face element 127 to the face element 128 to smmothly connect the pair of face elements 127, 128.

Figure 5:
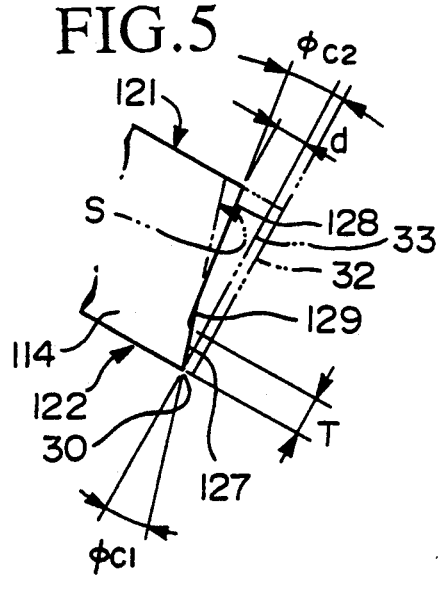
FIG. 5 is a perspective of the insert of FIG. 1 as seen in the direction indicated by the arrow V in FIG. 1.
Figure 15:
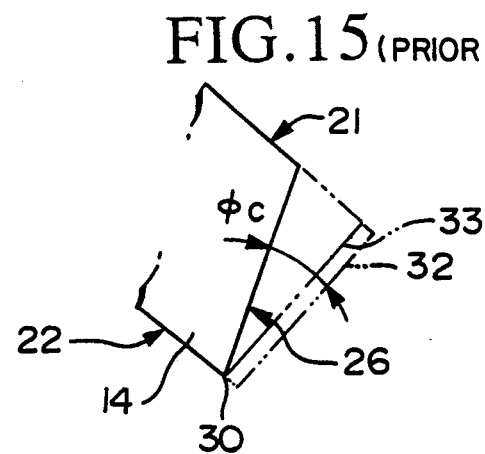
FIG. 15 is a perspective of the insert of FIG. 11 as seen in the direction indicated by the arrow XV in FIG. 11.

As shown in FIG. 5, the insert flank angles $\phi_{c1}$, $\phi_{c2}$ of the face elements 127, 128 are given different values with each other, where the insert flank angles $\phi_{c1}$, $\phi_{c2}$ respectively mean a slant angle of the face elements 127, 128 to an imaginary intersection 32, shown in phantom lines in FIG. 5, which would be formed between the major face 114 and the side face 123 if the slant minor flank 126 were not formed. Since the insert flank angle $\phi_{c1}$ of the first face element 127 is determined to be greater than the insert flank angle $\phi_{c2}$ of the second face element 128, the rear end of the second face elements 128, corresponding to edge line Q shown in FIG. 2, protrudes outwardly from an imaginary plane S, which extends along the first face element 127 and intersects with the first major face 112 at an imaginary line SL shown in FIG. 1, toward the imaginary intersection 32. While the insert flank angle $\phi_{c1}$ of the first face element 127 may be appropriately determined in accordance with factors such as the dimensions of the insert 100 and a corner angle $\theta$, shown in FIG. 6 and to be described later, the example in the present embodiment is given the same angle as the insert flank angles $\phi_c$ of the minor flank 26 of the conventional insert 10 shown in FIG. 15 and described above. The insert flank angle $\phi_{c2}$ of the second face element 128 may be appropriately determined in accordance with the recess dimension d, measured from the imaginary intersection 32, and will be discussed later in detail. The length T of the first face element 127 may be determined appropriately in accordance with the insert flank angles $\phi_{c1}$, $\phi_{c2}$.

As shown in FIGS. 6 to 9, the insert 100 formed as above is then mounted, and secured with the bolt B, on a mounting seat 40 disposed on an external circumference at the front end of the tool body 35, so that a predetermined corner angle $\theta$ is provided to the insert 100 so mounted. The insert 100 so secured is turned around the axis of the tool body 35 together with the tool body 35 to be used for cutting a workpiece (not shown). When mounted, one of the second pair of the side faces 123, 124 facing toward the rear of the tool body 35 in the axial direction of the tool body 35 (123 in the case of FIGS. 6 to 9) and one of the first side faces 121, 122 facing toward the opposite of the direction of rotation of the tool body 35 (121 in the case of FIGS. 6 to 9) are respectively faced and in contact to insert positioning reference faces 43, 41 of the mounting seat 40, to serve as the positioning reference face on the insert side, and also the load-supporting surface during the cutting operation. The side face 123 facing a chip pocket 45 located in the tool body 35, on the front side of the direction of the tool body rotation, adjacent to the mounting seat 40, constitutes a rake face to the major cutting edge 25, a factor in the cutting operation. While the corner angle $\theta$ may be appropriately determined in accordance with the cutting conditions, it is set at 60 degrees in the case of the present embodiment shown in FIG. 6.

In the insert 100 in accordance with the present embodiment of the present invention, each of the minor flanks 126 is bent inwardly to form a multi-stage face comprising two face elements 127, 128, and the insert flank angle $\phi_{c1}$ of the first face element 127 is set to be greater than the insert flank angle $\phi_{c2}$ of the second face element 128, so that the rear end of the second face elements 128 protrudes outwardly from the plane S extended along the first face element 127.

Figure 1:
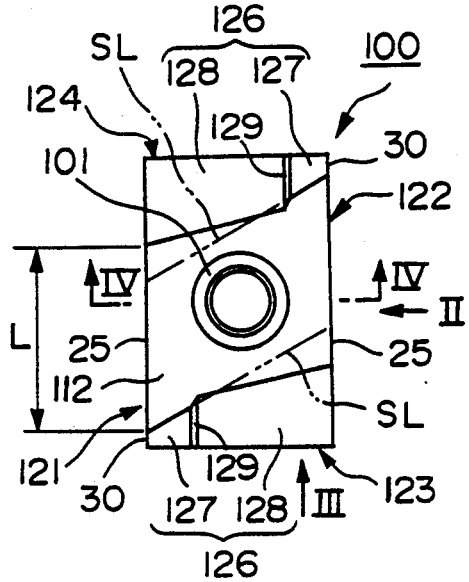
FIG. 1 is a plan view of a throwaway insert in accordance with a first embodiment of the present invention.
Figure 2:
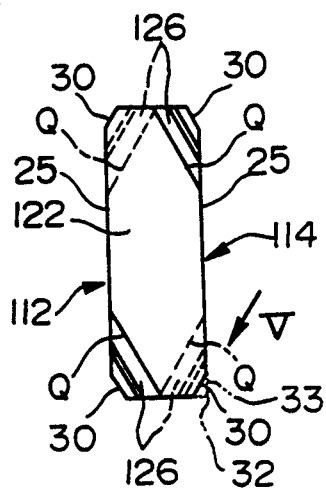
FIG. 2 is a side elevational view of the insert of FIG. 1 seen in the direction indicated by the arrow II in FIG. 1.
Figure 3:
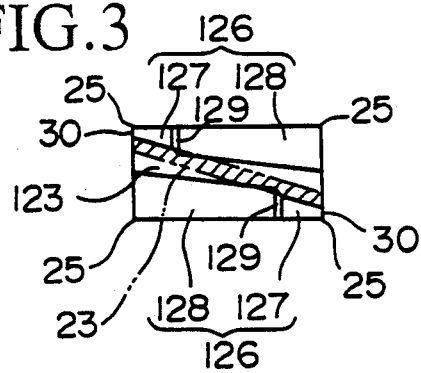
FIG. 3 is a side elevational view of the insert of FIG. 1 seen in the direction indicated by the arrow III in FIG. 1.
Figure 4:
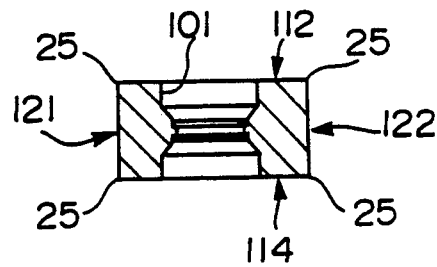
FIG. 4 is a cross-sectional view of the insert of FIG. 1 taken along the line IV—IV in FIG. 1.

Therefore, as shown in FIGS. 1, 5, with the introduction of such multi-staged minor flanks 126 into the insert 100, the length cut away from the major cutting edge 25 by the minor flank 126 is shortened, compared with the conventional insert 10, in which the entire minor flank 26 is formed as a slant face having a single slant angle, same as the insert flank angle $\phi_{c1}$ of the first face element 127, whereby the effective length L of the major cutting edge 25 is greatly lengthened. Subsequently, an advantage is obtained in that a greater maximum cutting depth $\delta$ can be provided in accordance with the present invention, compared with the conventional insert described earlier.

Furthermore, since the insert flank angle $\phi_{c2}$ of the first face element 127 is set to be smaller than the insert flank angle $\phi_c$ of the conventional insert 10 (FIG. 15), the area cut away from the side face 123 by the second face element 128 of the minor flank 126 is decreased, compared with the conventional insert 10, in which the entire minor flank 26 is formed as a single face including the first face element 127 and the extension thereof. As a result, the area of the side face 123 is increased that, when mounted, comes in contact to the insert positioning reference face 41 of the mounting seat 40 of the tool body 35, facing forward in the axial direction of the tool body 35, compared with the area of the side face 23 of the conventional insert 10, shown in hatching lines in FIG. 3 for the purpose of comparison. Accordingly, the mounting stability of the insert 100 is greatly improved.

The advantageous effects described above are more significantly enhanced, particularly as the corner angle $\theta$ of the insert 100 increases. This occurs in spite of the fact that: the insert flank angle $\phi_{c1}$ of the first face element 127 of the insert 100, which adjoins the minor cutting edge 30, determines the front relief angle of the minor cutting edge 30 when the insert 100 is mounted on the tool body 35, and must be set at a greater value as the corner angle $\theta$ of the insert 100 becomes greater; however, increasing the insert flank angle $\phi_{c1}$ may cause the cut-away amount of the major cutting edge 25 and the side face 123 to increase in case of the conventional insert, whereby the length of the major cutting edge 25 and the area of the side face 123 decrease; nevertheless, in the insert 100 in accordance with the present embodiment, only the insert flank angle $\phi_{c1}$ of the first face element 127 has to be varied in accordance with the corner angle $\theta$, without affecting the insert flank angle $\phi_{c2}$ of the second face element 128 and the position of the rear end of the second face element 128 on the major cutting edge 25; thus, the length L of the major cutting edge 25 is not adversely affected.

The insert flank angle $\phi_{c2}$ of the second face element 128 may be appropriately determined in accordance with the recess dimension d, measured from the imaginary intersection 32, as described above. Specifically, the insert flank angle $\phi_{c2}$ of the second face element 128 may be determined so that the rear end of the minor flank 124 recesses from the minor cutting edge 30 protruding forward from the tool body 35 in the axial direction of the tool body 35, by a predetermined recess amount h, shown in FIG. 7. The recess amount h may be advantageously determined within a range of at least 0.3 mm or greater.

Figure 10:
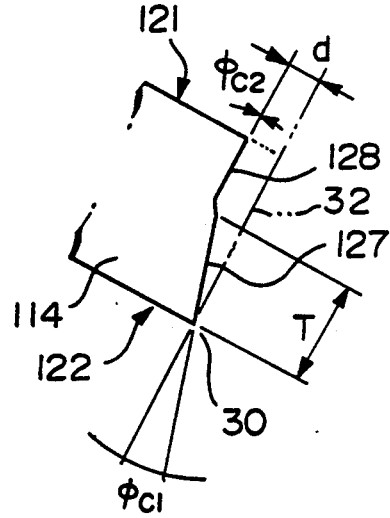
FIG. 10 is a perspective of a throwaway insert in accordance with another embodiment of the present invention, as seen in the direction similar to that indicated by the arrow V in FIG. 1, showing a minor flank of the insert.
Figure 6:
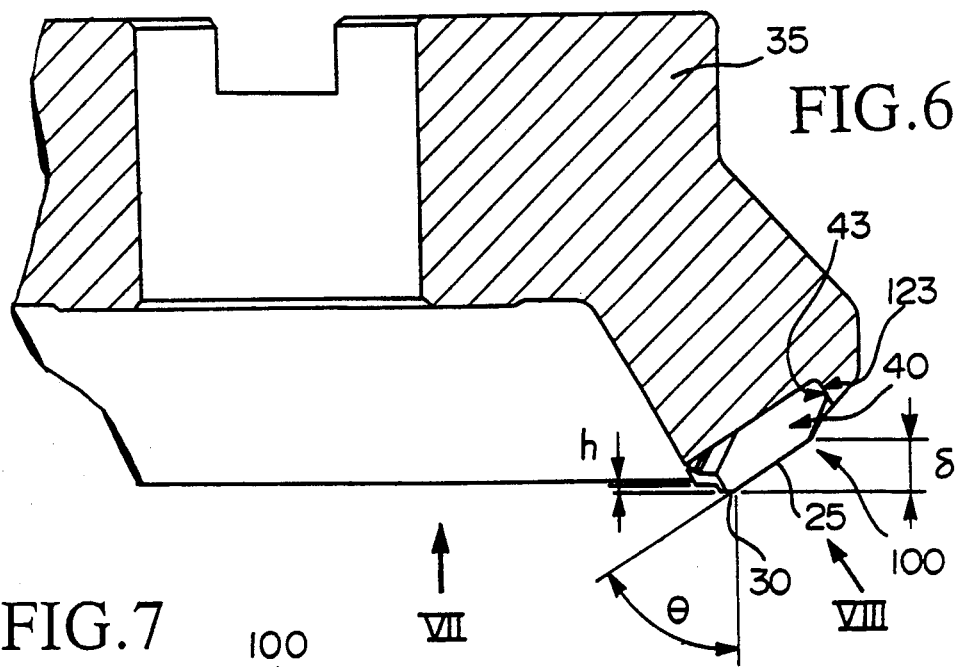
FIG. 6 is a cross-sectional view of a face milling cutter with the insert of FIG. 1 mounted on a mounting seat thereof.

In the insert 100, in accordance with the present embodiment, both the first and second face elements 127, 128 are formed to have the respective slant faces which recess inwardly as the minor flank proceeds from the one (or front) end toward the other (or rear) end thereof. However, the present invention is not limited by the present embodiment. For example, a second embodiment of the present embodiment, as shown in FIG. 10, is possible, in which the second face element 128 is determined to have an insert flank angle $\phi_{c2}$ thereof of zero degrees, i.e., the second face element 128 may be defined to be in parallel with the imaginary intersection 32.

Furthermore, in the insert 100, in accordance with the present embodiment, the minor flank 124 is once bent and comprises the first and second face elements 127, 128. However, the present invention is not limited by the embodiment. The multi-stage face of the minor flank may have the face elements of two or more than that. In the case of such multi-stage minor flank, the insert flank angle for intermediately positioned face elements of the minor flank does not have to be limited except the face elements located at both ends of the minor flank. Only condition needed to obtain a longer length of the major cutting edge is that the rear end of the face element located most in rear of the minor flank protrudes outwardly from the plane extended along the face element located most in front of the minor flank.

What is claimed is:

1. A throwaway insert having a generally quadrilateral-shaped flat plate configuration, said insert comprising:

first and second generally quadrilateral-shaped major faces disposed parallel and opposite to each other;

a first pair of oppositely facing first and second side faces respectively extending between two opposite side margins of said first major face and two opposite side margins of said second major face;

a remaining second pair of oppositely facing third and fourth side faces respectively extending between remaining two side margins of said first major face and remaining two sided margins of said second major face;

major cutting edges, one each constituted along each of said respective intersections of each of said first and second major faces with each of said first and second side faces;

minor flanks, one each respectively constituted along each of said respective intersections of each of said first and second major faces with each of said third and fourth side faces, said minor flanks respectively extending between a pair of oppositely formed intersections of said first major face with said first and second side faces, and between a pair of said oppositely formed intersections of said second major face with the first and second side faces, where said intersection constitutes said major cutting edge;

minor cutting edges, one each respectively constituted along each of the intersections of one end of each of said minor flanks with either of said first and second side faces;

each of said minor flanks including a transition portion so as to form a multi-stage face of concave cross section including at least first and second face elements which adjacently follow on another and collectively extend from said one end to the other end of said minor flank so that an insert relief angle of said second face element is less than an insert relief angle of said first face element.

2. A throwaway insert according to claim 1, wherein said face elements number more than two.

3. A throwaway insert according to claim 1, wherein said insert relief angle of said second face element is greater than zero degrees.

4. A throwaway insert according to claim 1, wherein said insert relief angle of said second face element is 5. A throwaway insert according to claim 1, wherein said quadrilateral-shape is rectangular.

* * * * *